F. OTREMBA.
DIRIGIBLE HEADLIGHT.
APPLICATION FILED JAN. 26, 1922.
1,437,544.
Patented Dec. 5, 1922.
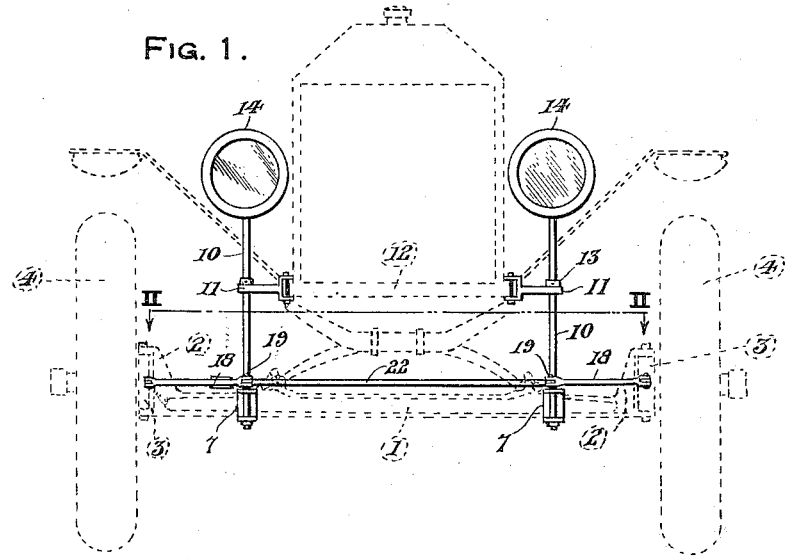
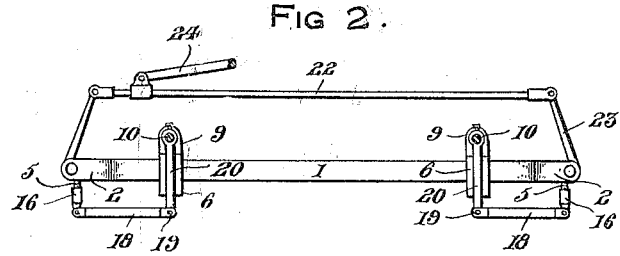
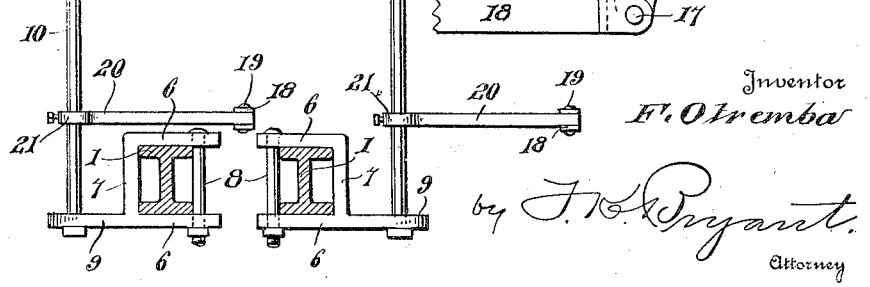

Patented Dec. 5, 1922.

1,437,544

UNITED STATES PATENT OFFICE.

FRANK OTREMBA, OF BURGETTSTOWN, PENNSYLVANIA, ASSIGNOR OF ONE-HALF TO ALBIN TARKA, OF CHERRY VALLEY, PENNSYLVANIA.

DIRIGIBLE HEADLIGHT.

Application filed January 26, 1922. Serial No. 531,964.

*To all whom it may concern:*

Be it known that I, FRANK OTREMBA, a citizen of the United States of America, residing at Burgettstown, in the county of Washington and State of Pennsylvania, have invented certain new and useful Improvements in Dirigible Headlights, of which the following is a specification.

This invention relates to certain new and useful improvements in dirigible headlights for automobiles, and has particular reference to the idea of operatively connecting the headlights to the steering mechanism of the automobile so that when the front steering wheels of the automobile are turned to either the right or left, the headlights will be similarly shifted to cast the rays therefrom in a direction directly forwardly of the travel of the automobile.

In certain automobiles, such as the Ford, a stud screw projects forwardly of each steering knuckle at the front end of the automobile, the present invention being especially designed for adjustable connection with said stud bolt to permit easy and quick mounting of the device upon an automobile of this type.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 shows by dotted lines a front elevational view of an automobile with the present type of dirigible head-light operatively mounted thereon, Figure 2 is a horizontal sectional view taken on line II—II of Fig. 1, showing the dirigible headlight frame structure operatively connected to steering knuckles of the automobile, Figure 3 is a fragmentary detail sectional view showing the perpendicular shaft supporting a headlight disposed rearwardly of the forward cross bar of the frame chassis, Figure 4 is a detail sectional view, similar to Fig. 3, showing the perpendicular shaft disposed forwardly of the chassis frame bar, and Figure 5 is a fragmentary detail sectional view showing the screw studs or bolts carried by the steering knuckle of the automobile with the dirigible headlight mechanism adjustably connected thereto.

The invention is illustrated as attached to an automobile of the Ford type, the latter embodying a chassis frame including a forward cross bar 1 carrying brackets 2 at the ends thereof for supporting steering knuckles 3 associated with wheels 4. In certain types of automobiles, such as the Ford automobile, a screw stud or bolt 5 is carried by each steering knuckle and projects forwardly thereof, the dirigible headlight mechanism disclosed in this application being operatively associated with the screw-studs 5.

The support for the headlight mechanism includes a bracket of substantially U-shaped formation having side arms 6 and a cross connecting arm 7, the side arms enclosing the chassis frame bar 1 and anchored thereto by the bolts 8 extending through the free ends of the arms 6. As shown more clearly in Figs. 3 and 4, an arm 9 projects rearwardly from the U-shaped bracket and has vertically journaled therein, a lamp supporting shaft 10, said shaft being further supported by the bracket arm 11 secured to and projecting laterally from the body 12 with a collar or disk 13 carried by the shaft 10 to be supported on the bracket 11. It will therefore be seen that the shaft 10 is freely rotatable in the bracket arm 9 and also in the bracket arm 11 with the disk 13 fixed to the shaft resting on the bracket arm 11 to hold the shaft at its proper elevation. A headlight lamp 14 is adjustably connected as at 15 to the upper end of the shaft 10 and moves with the shaft.

The connection between the steering knuckles 3 and the lamp supporting shaft 10 includes an internally threaded socket member 16 adjustably threaded onto the screw stud 5, shown more clearly in Figs. 2 and 5, the socket member 16 associated with each screw stud being pivotally connected as at 17 to the outer ends thereof, to a link arm 18, the other end of the link arm being pivotally connected as at 19 to the rod or arm 20 with the other end of the arm 20 adjustably secured to the lamp supporting shaft 10 as indicated by the numeral 21.

The steering mechanism for the front wheels of the automobile includes a cross steering shaft 22 having end link connections 23 with the steering knuckles 3 as shown in Fig. 2, the rod 24 attached to the steering shaft 22 being operatively associated with the steering post of the automobile.

From the above detail description of the device it is believed that the construction and operation thereof will at once be apparent, it being noted that the lamp supporting shaft 10 may be either disposed rearwardly or forwardly of the front cross channel bar 1 of the chassis frame, as shown in Figs. 3 and 4 while the arm 20 of the mechanism for shifting the lamp supporting post 10 is disposed upwardly of the chassis frame bar 1. Upon shifting movement of the steering wheel 4 of the automobile in either direction, by their association with the steering knuckles 3, the connection between the steering knuckles and the lamp supporting post 10 provides for a simultaneously rotatable movement of the lamp supporting post to cause the lamps 14 to project the light rays in directions directly forwardly of the automobile. As certain automobiles, as above stated are equipped with the screw studs 5, the dirigible headlight mechanism associated with the automobile, and adapted for attachment to said screw studs, only embodies the mounting bracket for the chassis frame bar, the lamp post, and the connecting elements between the lamp post and the screw studs. These elements are capable of manufacture at a low cost and installation or mounting thereof upon an automobile does not necessarily require the services of a skilled mechanic.

While there is herein shown and described the preferred embodiment of the present invention, it is nevertheless to be understood that minor changes may be made therein without departing from the spirit and scope thereof.

What is claimed as new is:—

In a dirigible headlight for automobiles, substantially U-shaped bracket arms secured to the forward bar of the chassis, substantially U-shaped bracket arms extending laterally of the body of the automobile, the said U-shaped bracket arms consisting of parallel side arms and a cross connecting vertical arm lying at right angles to the said side arm, a bolt extending through openings in the free ends of the said side arms for anchoring the said bracket member to its proper place upon the vehicle, an arm formed integrally with the said U-shaped bracket member and extending horizontally therefrom, lamp supporting shafts journaled in the said horizontally extending arms of the bracket members, disks fixed to the said shafts and resting upon the bracket arms that extend laterally of the body of the automobile for holding the shaft at its proper elevation, a screw stud carried by each steering knuckle, an internally threaded socket member adjustably mounted on each screw stud, connecting link arms associated with the socket members and the lamp supporting shaft, and lamps adjustably mounted on said shafts.

In testimony whereof I affix my signature.

FRANK OTREMBA.